Nov. 3, 1936.        J. F. MacINDOE        2,059,701
PRESSURE FITTING FOR LUBRICATION

Filed April 26, 1933

INVENTOR
JOHN F. MAC INDOE.
BY
ATTORNEY

Patented Nov. 3, 1936

2,059,701

UNITED STATES PATENT OFFICE 2,059,701

PRESSURE FITTING FOR LUBRICATION

John Franklin MacIndoe, Philadelphia, Pa., assignor to The Lubrication Corporation, Chicago, Ill., a corporation of Delaware Application April 26, 1933, Serial No. 667,996

7 Claims. (Cl. 184—105)

This invention relates to lubrication fittings or nipples and more particularly to devices of this character adapted to be secured to a machine or the like to be lubricated and to be detachably connected to a supply nozzle or coupling from which lubricant is supplied to the part to be lubricated.

One of the objects of the invention is to provide a lubrication nipple which forms an automatic positive seal against leakage.

Another object is to provide a lubrication nipple in which entry of dirt or foreign material into the nipple is substantially prevented.

Another object is to provide a valved nipple which forms a free passage for lubricant, which will prevent leakage of lubricant, and which will exclude dirt or other foreign matter.

Further objects, advantages and desirable features of the invention will be apparent from the following description when read in connection with the accompanying drawing, in which.

Figure 1:
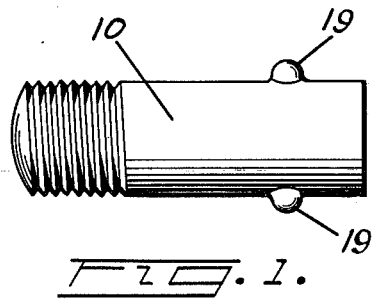
Fig. 1 is a side view of a lubrication nipple embodying the invention.
Figure 2:
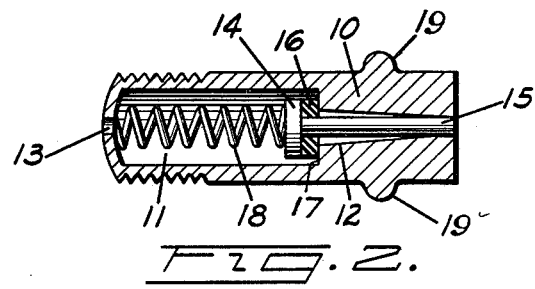
Fig. 2 is an axial section through the nipple of Fig. 1.

Figs. 1 and 2 illustrate a nipple formed with a body portion 10 having a tubular externally threaded end portion hollowed out to form a chamber 11 for communication with an inlet passage 12 formed in the body portion 10. The end of the nipple adjacent the chamber 11 is spun over to enclose a control valve mechanism and to leave an outlet port 13 axially of the nipple.

A control valve including a disc 14 is mounted in the chamber 11 and has a stem 15 extending through the inlet passage 12 and a washer 16 of cork leather or other suitable material carried by the disc 14 and seating against a shoulder 17 formed at the juncture of the chamber 11 and the passage 12. The valve is urged against its seat by a coil spring 18, one end of which engages the disc 14 and the other end of which seats against the spun over portion of the body 10. Since the spring 18 is normally under compression, it serves to hold the valve 14 and washer 16 seated against the shoulders 17 to close the passage 12. Preferably the valve stem 15 terminates substantially flush with the inlet end of the nipple when the washer 16 is new and hence if wear occurs on the washer such as to reduce its thickness, there will be a corresponding protruding of the end of the valve stem 15 so that it becomes in this way a measurer of the wear condition of the washer 16.

In order to facilitate the inflow of grease under pressure, the inlet passage 12 is preferably tapered, that is increased gradually in diameter from its inlet end to its discharge end and in this way exposes a larger area of the face of washer 16 to grease pressure to insure prompt opening of the valve during use. Tapering of the bore 12 also provides a gradually increasing clearance for the valve stem 15 as it moves inwardly, it being noted that the valve stem 15 is of substantially the same diameter as the outer end of bore 12 so that when the valve is seated, the valve stem closes the outer end of the bore to prevent entry of dirt or foreign particles into the nipple.

As a means for attaching a nozzle or coupling to the nipple for introducing grease and to permit the ready removal thereof after the filling operation, the body 10 is provided with two diametrically opposite integral lugs 19 for cooperation with a bayonet joint structure upon the coupling or other cooperating part. If desired the lugs 19 may be spaced from the receiving end of the nipple, a standard distance to receive a standard coupling, or may, if desired, be spaced some distance other than the standard distance in order that the nipple can cooperate only with the particular coupling for which it is designed.

Figure 3:
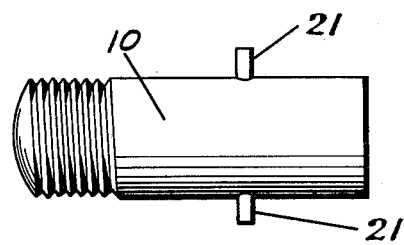
Fig. 3 is a side view of a modified nipple construction.
Figure 4:
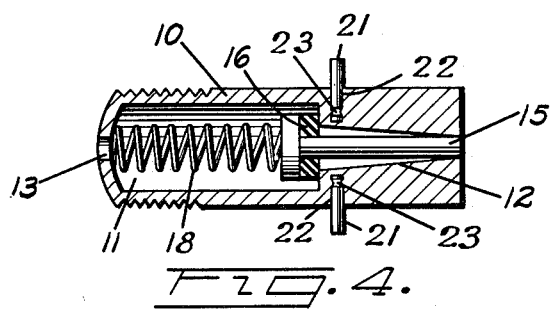
Fig. 4 is a central section through the nipple of Fig. 3.

Figs. 3 and 4 illustrate a modified construction which is substantially similar to that shown in Figs. 1 and 2 but which has a modified form of bayonet pin for connection purposes. Those elements which are common to the form shown in Figs. 1 and 2 are given like reference numerals to avoid confusion and for the sake of brevity of description. In the nipple of Figs. 3 and 4 the body portion 10 is provided with two radially projecting pins 21 for cooperation with a bayonet joint structure upon the coupler or nozzle.

In order to secure the pins 21 rigidly in place without obstructing the passage 12, the body portion 10 is drilled with two holes 22 respectively of a size to receive the pins 21 with a tight driving fit, and to anchor the pins therein each pin has a circumferential groove 23. When the pins 21 are driven in, the body of the nipple is swaged by a hammer blow or is subjected to pressure in a press to cause the metal of the nipple body opposite to the grooves 23 to flow into such grooves and thus to prevent the pins 21 from becoming detached. This structure avoids the objections present in bayonet joints as heretofore constructed where there is a single pin passing through the body of the nipple and allows an unobstructed passage for lubricant.

The fittings described above may be employed in connection with a coupler or nozzle such as that illustrated and claimed in my Patent No. 1,865,932 by attaching the coupler to the nipple through the bayonet lugs 19 or 21. Upon the application of lubricant pressure the valve 14 will be depressed against the spring 18 permitting the flow of lubricant through the passage 12 around the stem 15 and past the washer 16 and out through the opening 13 to the bearing or other part to be lubricated. The travel of the valve during its opening movement is less than the length of the valve stem 15 so that the end of the stem stays in the passage 12 at all times and the stem will serve to guide the valve to its seat. It will be noted that the control valve is located in a chamber separate from the supply passage and seats over a relatively large area upon a soft gasket to provide a positive closing of the valve under all conditions. Also since the connector lugs or pins do not project into or through the lubricant supply passage, there is no possibility of leakage around such pins and a substantially leak-proof nipple is provided. Since the valve parts are removed from the grease inlet and due to the fact that the grease inlet is substantially closed by the end of valve stem 15, no dirt or the like can find its way into the valve to cause wear or leakage.

While two embodiments of the invention have been shown and described, it will be apparent that many changes might be made therein and it is not intended to be limited to the forms shown or otherwise than by the terms of the appended claims.

What I claim is:

1. A nipple comprising, a body having a portion forming a chamber and a portion having a tapered passage therethrough terminating at its smaller end in a lubricant inlet and communicating at its larger end with said chamber, said chamber end portion being provided with a discharge port, a valve in said chamber arranged to seat over said passage, said valve being of lesser diameter than said chamber, an annular washer forming the working face of said valve, a spring in said chamber normally holding said valve seated, a stem on said valve extending into said passage and forming locating means for said washer, said stem being of greater length than said valve and cooperating at its outer end with the tapered wall of said passageway to provide a guide means for seating the valve over the end of said passageway, and means for attaching a grease supply fitting to the passage end of said nipple.

2. A lubricant fitting comprising, a body having a relatively long lubricant passageway extending therethrough terminating at one end in an inlet port and at its opposite end in a valve chamber and providing a valve seat within the confines of the chamber, a valve member within said chamber, said valve having a body of less diameter than the diameter of said chamber, a spring within the chamber urging said valve member upon said seat, and an elongated stem extending forwardly from said valve body, said stem being of greater length than the length of the valve body and being disposed within that portion of said lubricant passageway between said chamber and said inlet port and free to move longitudinally therein when the valve is depressed against the force of said spring, the relative lengths of said passageway between the valve seat and said inlet, of said valve and of said stem being such as to cause the outermost end of the stem to lie flush with the outer wall of the fitting at the inlet end of the passageway when the valve is closed and to maintain a portion of the valve stem within the said portion of the passageway when the valve is at maximum open position.

3. A lubricant fitting comprising, a body having a relatively long tapered lubricant passageway extending therethrough terminating at its smaller end in an inlet port and at its opposite end in a valve chamber and providing a valve seat within the confines of the chamber, a valve member within said chamber, said valve having a body of less diameter than the diameter of said chamber, a spring within the chamber urging said valve member upon said seat, and an elongated stem extending forwardly from said valve body, said stem being of greater length than the length of the valve body and being disposed within that portion of said tapered lubricant passageway between said chamber and said inlet port and free to move longitudinally therein when the valve is depressed against the force of said spring, the relative lengths of said passageway between the valve seat and said inlet, of said valve and of said stem being such as to cause the outermost end of the stem to lie flush with the outer wall of the fitting at the inlet end of the passageway when the valve is closed and to maintain a portion of the valve stem within the said portion of the passageway when the valve is at maximum open position.

4. A nipple comprising, a body having a portion forming a chamber and a portion having a tapered passage therethrough terminating at its smaller end in a lubricant inlet and communicating at its larger end with said chamber, said chamber end portion being provided with a discharge port, a valve in said chamber arranged to seat over said passage, said valve being of lesser diameter than said chamber, an annular washer forming the working face of said valve, a spring in said chamber normally holding said valve seated, and a stem on said valve extending into said passage and forming locating means for said washer, said stem being of greater length than said valve and cooperating at its outer end with the tapered wall of said passageway to provide a guide means for seating the valve over the end of said passageway.

5. A nipple comprising, a body having a portion forming a chamber and a portion having a tapered passage therethrough terminating at its smaller end in a lubricant inlet and communicating at its larger end with said chamber, said chamber end portion being provided with a discharge port, a valve in said chamber arranged to seat over said passage, said valve being of lesser diameter than said chamber, a spring in said chamber normally holding said valve seated, and a stem on said valve extending into said passage, said stem being of greater length than said valve and cooperating at its outer end with the tapered wall of said passageway to provide a guide means for seating the valve over the end of said passageway.

6. A lubricant nipple comprising a body having a relatively long lubricant passage extending therethrough terminating at one end in an inlet port and at its opposite end in a valve chamber and providing a valve seat within the confines of said chamber, a valve within said chamber, said valve having a body of less diameter than the diameter of said chamber, resilient means urging said valve upon said seat, a valve stem on the valve of substantially the same length as said passage between the inlet port and valve seat and disposed therein whereby when the valve is seated the outer end of the stem will be substantially flush with the outer wall of the nipple at the inlet port, said valve having a travel less than the length of the stem to maintain a portion of the stem within the passage when the valve is open.

7. A lubricant nipple comprising a body having a portion forming a chamber and a portion forming an inlet passage leading into said chamber and formed with a valve seat between the passage and chamber, said passage having a relatively small bore at its outer end and a bore of larger diameter remote therefrom, a valve in said chamber having a diameter less than that of the chamber, means for yieldingly urging said valve toward said valve seat, an elongated stem on said valve having a diameter at its outer end substantially equal to that of the outer end of said passage and having a length substantially equal to the length of the passage whereby when the valve is seated, the outer end of the stem is substantially flush with the outer end of the passage, said stem and valve having an axial travel less than the length of the stem whereby the stem will always remain in the passage to guide the valve to its seat.

JOHN FRANKLIN MacINDOE.